(12) United States Patent
Preshel

(10) Patent No.: US 10,149,569 B2
(45) Date of Patent: Dec. 11, 2018

(54) CONTAINER FOR DISPENSING A SUBSTANCE

(71) Applicant: Asi Preshel, Kfar Tavor (IL)

(72) Inventor: Asi Preshel, Kfar Tavor (IL)

(*) Notice: Subject to any disclaimer, the term of this patent is extended or adjusted under 35 U.S.C. 154(b) by 0 days.

(21) Appl. No.: 15/549,328

(22) PCT Filed: Feb. 25, 2016

(86) PCT No.: PCT/IL2016/050214
§ 371 (c)(1),
(2) Date: Aug. 7, 2017

(87) PCT Pub. No.: WO2016/142932
PCT Pub. Date: Sep. 15, 2016

(65) Prior Publication Data
US 2018/0035838 A1 Feb. 8, 2018

(30) Foreign Application Priority Data

Mar. 9, 2015 (IL) .......................................... 237635

(51) Int. Cl.
*G07F 11/16* (2006.01)
*A47J 31/40* (2006.01)
(Continued)

(52) U.S. Cl.
CPC .............. *A47J 31/40* (2013.01); *A47J 31/402* (2013.01); *A47J 31/4492* (2013.01); *A47J 31/46* (2013.01);
(Continued)

(58) Field of Classification Search
CPC ....... A47J 31/4492; A47J 31/46; B65D 77/20; B65D 77/30; B65D 83/0005; B65D 85/8043
(Continued)

(56) References Cited

U.S. PATENT DOCUMENTS 6,740,345 B2  5/2004  Cai
8,491,948 B2  7/2013  Ozanne
(Continued)

FOREIGN PATENT DOCUMENTS

CN  101380197 A  3/2009
EP    278773 A2  8/1988
(Continued)

OTHER PUBLICATIONS

International Search Report for PCT/IL2016/050214, dated May 11, 2016 (8 pages).
(Continued)

*Primary Examiner* — Phuong T Nguyen
(74) *Attorney, Agent, or Firm* — Roach Brown McCarthy & Gruber, P.C.; Kevin D. McCarthy

(57) ABSTRACT

The present invention relates to a capsule containing a liquid substance for the preparation of edible/drinkable products, said capsule comprising: a) a body defining a filling cavity filled with the liquid substance, said body having i) a liquid discharging portion, provided at a first end of said body, through which said liquid substance can be discharged from said body, and ii) an accessing region provided at a second end of said body! and b) at least one separator slidably mounted in said body, wherein said separator can be actuated to slide in a liquid discharging direction in order to discharge said liquid substance through said liquid discharging portion, wherein the actuation of said separator is applied through the accessing region.

20 Claims, 6 Drawing Sheets

(51) Int. Cl.
*A47J 31/44* (2006.01)
*A47J 31/46* (2006.01)
*B65D 77/20* (2006.01)
*B65D 77/30* (2006.01)
*B65D 83/00* (2006.01)
*B65D 85/804* (2006.01)
*B65D 85/72* (2006.01)

(52) U.S. Cl.
CPC ......... *B65D 77/20* (2013.01); *B65D 77/2032* (2013.01); *B65D 77/30* (2013.01); *B65D 83/0005* (2013.01); *B65D 85/72* (2013.01); *B65D 85/8043* (2013.01); *B65D 2231/005* (2013.01)

(58) Field of Classification Search
USPC .................. 99/295, 286, 287, 288, 300, 323
See application file for complete search history.

(56) References Cited

U.S. PATENT DOCUMENTS

| | | |
|---|---|---|
| 2002/0078831 A1 | 6/2002 | Cai |
| 2003/0172813 A1 | 9/2003 | Schifferle |
| 2008/0017662 A1* | 1/2008 | Loranger ................ G07F 11/14 221/226 |
| 2010/0080886 A1* | 4/2010 | Hourizadeh ........ A47J 31/3609 426/595 |
| 2012/0258422 A1 | 10/2012 | Leiner |
| 2013/0180407 A1 | 7/2013 | Colleoni |

FOREIGN PATENT DOCUMENTS

| | | |
|---|---|---|
| EP | 0512468 A1 | 11/1992 |
| EP | 1211950 A1 | 6/2002 |
| EP | 1586534 A1 | 10/2005 |
| WO | 2005/066040 A2 | 7/2005 |
| WO | 2010/091261 A1 | 8/2010 |
| WO | 2010/102665 A1 | 9/2010 |
| WO | 2012/062842 A1 | 5/2012 |
| WO | 2013/036564 A2 | 3/2013 |

OTHER PUBLICATIONS

International Search Report for PCT/IL2016/050214, dated May 4, 2016 (8 pages).
Communication document regarding typographical error in International Search Report for PCT/IL2016/050214, dated May 4, 2016 that is being corrected in International Search Report for PCT/IL2016/050214, dated May 11, 2016 (1 page).
Written Opinion of the International Searching Authority for PCT/IL2016/050214, dated May 4, 2016 (5 pages).
Communication and Supplementary European Search Report from a foreign patent office (EPO) in a counterpart foreign application (EP 16 76 1196), dated Feb. 13, 2018, 8 pages.

* cited by examiner

CONTAINER FOR DISPENSING A SUBSTANCE

FIELD OF THE INVENTION

The present invention relates to the field of beverage preparation by dispensing of a substance. More particularly, the invention relates to dispensing of a substance from a container by means of a dispensing apparatus.

BACKGROUND OF THE INVENTION

Disposable pods and capsules are well known from the prior art and described in particular publications such as U.S. Pat. No. 8,491,948, EP 0512468, and EP 278,773. For example, EP 278,773 discloses a beverage dispensing system. This dispensing system is adapted to empty a bag containing a flavoring constituent for the preparation of a carbonated beverage. The bag is inserted into a dispensing unit, which has means to compress the bag and expel the content out of it into a discharge nozzle. However, such prior-art solutions require compressing the body of the bag or capsule in order to discharge the substance stored therein. A major drawback of this type of solution is that the dispensing apparatus becomes very messy due to this opening and discharge method, and therefore it requires a frustrating cleaning task repeatedly.

It is an object of the present invention to provide a container for dispensing a substance while eliminating the need to compress the body of the container.

Other objects and advantages of the invention will become apparent as the description proceeds.

SUMMARY OF THE INVENTION

The present invention relates to a capsule containing a liquid substance for the preparation of edible/drinkable products, said capsule comprising: a) a body defining a filling cavity filled with the liquid substance, said body having i) a liquid discharging portion, provided at a first end of said body, through which said liquid substance can be discharged from said body, and ii) an accessing region provided at a second end of said body; and b) at least one separator slidably mounted in said body, wherein said separator can be actuated to slide in a liquid discharging direction in order to discharge said liquid substance through said liquid discharging portion, wherein the actuation of said separator is applied through the accessing region.

According to an embodiment of the invention, the liquid discharging portion includes a dispensing channel in fluid communication with the cavity, wherein said dispensing channel extends from the body of said capsule at the first end, wherein the liquid substance can be discharged through said dispensing channel upon unsealing at least one passage opening at said dispensing channel.

According to an embodiment of the invention, the at least one passage opening is sealed by a break-off closure, such that by folding or breaking said break-off closure said at least one passage opening becomes unsealed.

According to an embodiment of the invention, the liquid discharging portion includes an opening at the first end of said cavity and an integral planar circumferential rim surrounding said opening, wherein said opening and said planar circumferential rim being covered by a cover, which is sealed to said planar circumferential rim at a circumferential sealing seam, wherein the liquid substance can be discharged through said opening upon forming at least one passage opening at said cover sheet.

According to an embodiment of the invention, the at least one passage opening is formed by perforating the cover sheet.

According to an embodiment of the invention, the liquid discharging portion includes: a) an opening at the first end of the filling cavity of said capsule; b) an integral planar circumferential rim surrounding said opening; c) a dispensing channel in fluid communication with said cavity and extending from said opening by said planar circumferential rim; and d) a cover that covers said opening, said planar circumferential rim and said dispensing channel, wherein the liquid substance can be discharged through said dispensing channel upon unsealing/forming at least one passage opening at said dispensing channel.

According to an embodiment of the invention, the cover is in form of a layer that is sealed to the planar circumferential rim at a circumferential sealing seam.

According to an embodiment of the invention, the at least passage opening is unsealed/formed by peeling off at least a portion of the layer that seals the dispensing channel.

According to an embodiment of the invention, the cover can be made from materials such as metal (e.g., aluminum) or plastic. Alternatively, the cover can be an integral part of the capsule's body.

According to an embodiment of the invention, the dispensing channel includes a break-off closure which seals the at least one passage opening at said dispensing channel, such that by folding or breaking said break-off closure said at least one passage opening becomes unsealed.

According to an embodiment of the invention, the capsule includes identification means that corresponds to a specific substance contained in said capsule, thereby allowing a dispensing device loaded with said capsule to automatically identify said capsule and the substance stored therein.

According to an embodiment of the invention, the dispensing channel having a funnel form or a semi conical form, thereby enabling to facilitate the discharging of the substance.

According to an embodiment of the invention, the body may further comprise one or more alignment rails parallel deployed along the length of said body, to correctly insert said capsule into a corresponding dispensing device and to act as reinforcement beams in order to prevent deformation of the structure of the body of said capsule.

According to an embodiment of the invention, the capsule is used for the preparation of more than one dose or cup by using more than one separator slidably mounted in the body of said capsule, wherein the separators are space apart in a way that the separators divide the cavity of the capsule into two or more compartments each of which adapted to store liquid substance, either the same liquid substance or different liquid substance in each compartment.

According to an embodiment of the invention, the separator having a form that fits the body in a way that it creates a sealed compartment with an adjustable volume within the filling cavity. For example, in case the body having a cylindrical form than the separator is having a spacer/disk-like form. The separator may have any geometrical form that can fit the structure of the capsule's body that defines the filling cavity.

In another aspect, the present invention relates to a drink dispensing device comprises a water source for feeding water through one or more dispensing pipes to a cup or a serving container on which is to be filled with a drink or a thick-food product, said device comprising: a receiving and actuating unit adapted to receive and actuate a capsule that is filled with a liquid substance, wherein said receiving and actuating unit includes a power unit for activating a first actuator adapted to cause the discharging of said liquid substance, by pushing a separator slidably mounted in said capsule in a liquid discharging direction, either directly or indirectly, towards a liquid discharging portion of said capsule.

According to an embodiment of the invention, the water source is a water storage tank or a water supply line.

According to an embodiment of the invention, the device further comprises a platform for placing the cup.

According to an embodiment of the invention, the dispensing pipes dispense either warm water, cold water, carbonated water, ambient water or any kind of other liquids such as alcoholic, beer or natural liquids.

According to an embodiment of the invention, the first actuator is adapted to engage an outer surface of the separator of the capsule through an accessing region at the body of said capsule.

According to an embodiment of the invention, the power unit includes at least one of the following activating means: pneumatic means, hydraulic means, linear electric motor, hand driven, or any combination thereof.

According to an embodiment of the invention, the device further comprises identification recognition means for automatically identifying the capsule and its content.

DETAILED DESCRIPTION OF THE INVENTION

Figure 1:
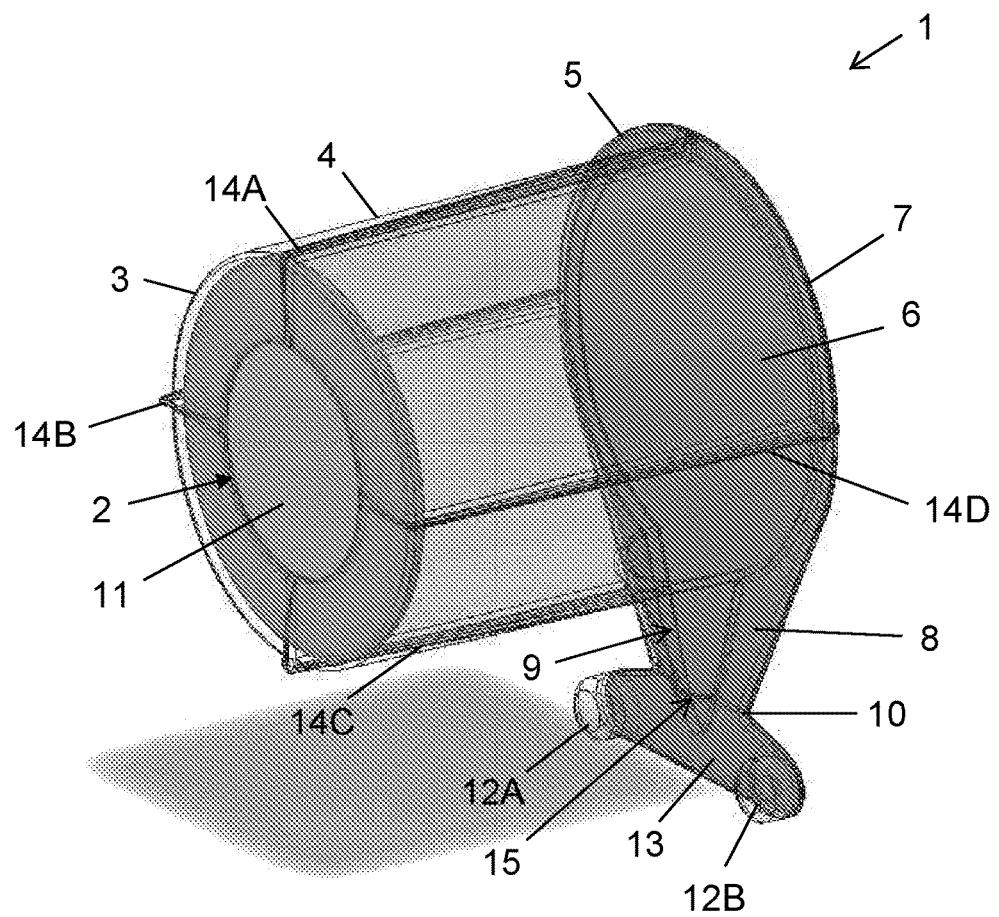
FIG. 1 schematically illustrates a semi-transparent rear perspective view of a capsule, according to an embodiment of the invention.

Throughout this description the term "capsule" is used to indicate a container adapted to hold a liquid or liquid-based substance, such as a flavoring constituent. This term does not imply any particular shape, construction material or geometry, and invention is applicable to all suitable liquid substance containers. For example, the capsule may have a cylindrical shape, a rectangular shape, or any other suitable geometrical form, etc.

The present invention relates to a capsule containing a liquid substance for the preparation of edible/drinkable products. The products can be soft foods, beverages, infant/baby formulas, or any other kind of product suitable for oral administration including products for medical purposes. According to an embodiment of the invention, the capsule comprises a body defining a filling cavity filled with the liquid substance. The body having a liquid discharging portion, provided at a first end of the body (e.g., at a front end of the capsule), through which the liquid substance can be discharged from the capsule. In addition, the capsule includes at least one separator slidably mounted in the body, wherein the separator can be actuated to slide in a liquid discharging direction, in order to discharge the liquid substance through the liquid discharging portion. The actuation of the separator can be obtained when pressure is applied on it through an accessing region located at a second end of the body (i.e., at a rear end of the capsule). The accessing region can be in form of an aperture, an elastic layer or element, or any other arrangement through which pressure can be applied to the separator, in order to enable it to slide in a liquid discharging direction.

The liquid discharging portion can be implemented in variety of form. For example, according to an embodiment of the invention, the fluid discharging portion may include a dispensing channel in fluid communication with the filling cavity. The dispensing channel may extend from the body of the capsule at the first end, and the liquid substance can be discharged through the dispensing channel upon unsealing at least one passage opening at the dispensing channel. For example, the at least one passage opening can be sealed by a rigid openable closure (e.g., in form of a break-off closure), thus by applying force at one or more portion of the closure, the closure breaks or folds along a weakened line and thereby the at least one passage opening will become unsealed.

Reference will now be made to several embodiments of the present invention, examples of which are illustrated in the accompanying figures. Wherever practicable similar or like reference numbers may be used in the figures and may indicate similar or like functionality. The figures depict embodiments of the present invention for purposes of illustration only. One skilled in the art will readily recognize from the following description that alternative embodiments of the structures and methods illustrated herein may be employed without departing from the principles of the invention described herein.

The terms, "for example", "e.g.", "optionally", as used herein, are intended to be used to introduce non-limiting examples. While certain references are made to certain example system components, other components can be used as well and/or the example components can be combined into fewer components and/or divided into further components.

Figure 2:
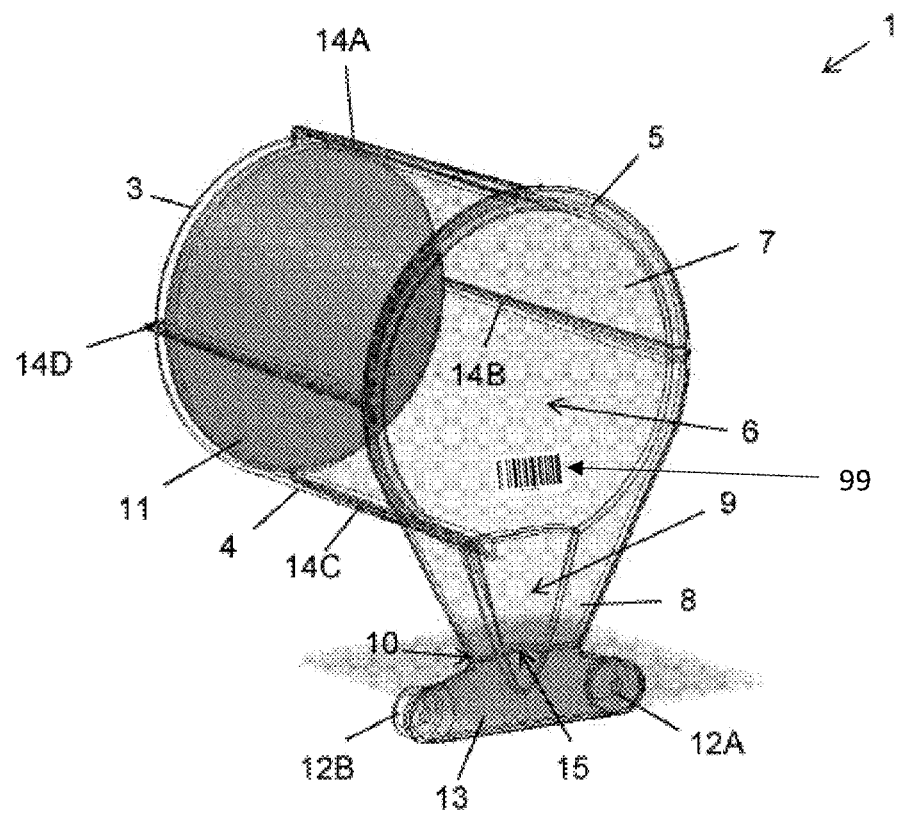
FIG. 2 schematically illustrates a semi-transparent front perspective view of the capsule of FIG. 1.
Figure 3:
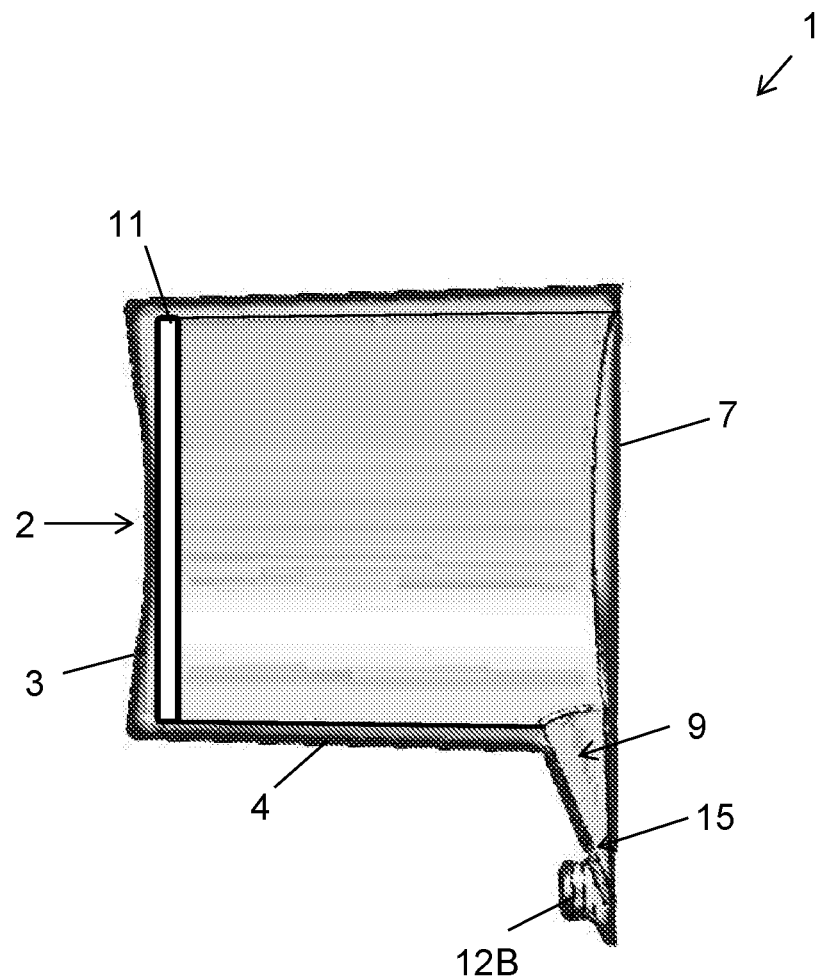
FIG. 3 shows a cross-section side view of the capsule of FIG. 1.

FIGS. 1-3 show a capsule 1 for containing a substance, according to an embodiment of the present invention. Capsule 1 comprises a body which can be made of materials such as plastic, aluminum, laminated cardboard paper, etc. Preferably the body of capsule 1 has a bottom 3 provided with an accessing region (e.g., in form of an accessing aperture as indicated by numeral 2) and a sidewall 4 extending from the bottom 3, which define a filling cavity. On the side opposite to the bottom 3, a planar circumferential rim 5 is integral with the sidewall 4 and extends outwardly therefrom. The circumferential rim 5 surrounds an opening 6. In this embodiment, a cover sheet 7 of foil material (e.g., aluminum) is sealed to the circumferential rim 5 by means of a circumferential sealing seam or sealing layer and closes the opening 6. The foil material can be a multilayer material. In other embodiments, opening 6 can be covered by a rigid material or it can be an integral part of the body of capsule 1 that can be made of materials such as plastic, aluminum, laminated cardboard paper, etc.

According to an embodiment of the invention, capsule 1 may include one or more alignment rails that can be deployed along the length of sidewall 4 as indicated by the four alignment rails 14A, 14B, 14C and 14D. Alignment rails 14A-14D may also be used to as guiding elements to correctly insert capsule 1 into a corresponding drink dispensing device as described hereinafter with respect to FIGS. 4 and 5A-5C. In addition, alignment rails 14A-14D may also be used as reinforcement beams that can help to maintain the structure of capsule 1 (i.e., they may prevent the deformation of the body of capsule 1), thereby enabling a separator 11 slidably mounted in the body of capsule 1, to slide easily within the filling cavity, as will be described in further details hereinafter.

In this embodiment, the liquid discharging portion of capsule 1 includes a dispensing channel 9 that is in fluid communication with the filing cavity. The dispensing channel 9 extends from the body of capsule 1 at the front end, wherein the circumferential rim 5 that has an extending tab 8 and cover sheet 7 forms a closure wall for the dispensing channel 9. In this embodiment, the dispensing channel 9 includes a passage opening 15 that is sealed by a break-off closure 13. Break-off closure 13 may include one or more pushable portions e.g., as indicated by numerals 12A and 12B through which it may unseal passage opening 15, when pressure is applied to at least one of the pushable portions 12A, 12B. As a result of the applied pressure, break-off closure 13 may unseal passage opening 15, e.g., by being fold or break. For example, the folding of break-off closure 13 may cause its detachment from dispensing channel 9 or it may cause, at least partially, for the peeling off the cover sheet 7. As can be seen in the figures, the dispensing channel 9 is an integrated part of the filling cavity, that is, it joins the filling cavity. The cover sheet 7 is also sealed to the extending tab 8 including the dispensing channel 9 and the break-off closure 13.

Capsule 1 comprises at least one separator 11 slidably mounted in its body. Separator 11 can be actuated to slide in a liquid discharging direction in order to discharge the liquid substance filled in the cavity through dispensing channel 9. In this embodiment, the actuation of separator 11 is applied through the accessing aperture 2. Separator 11 may have a disk-like form (e.g., an inner moveable disk that acts like an inner piston that is located within the filling cavity of capsule 1). In some embodiments, as an initial state, separator 11 can be positioned adjacent to bottom 3 such that it may also be used to seal accessing aperture 2. The accessing aperture 2 allows an external member (e.g., one or more actuators such as actuating rods) to apply pressure on separator 11 (e.g., to push separator 11 from the rear end of capsule 1 towards the liquid discharging portion at the front end of capsule 1). As will be appreciate by a person skilled in the art, separator 11 may have different forms, depending on the inner structure of the filling cavity, including disk-like form, rectangular form, oval form, etc.

According to an embodiment of the invention, the sealed zone of break-off closure 13 that seals passage opening 15 (as indicated by numeral 10 under the location of the discharge end of the dispensing channel 9) is weakened. For example, this can be done by giving the sealed zone 10 a smaller width than the rest of the circumference (e.g., by forming a slit). As a result, the dispensing channel 9 and the break-off closure 13 are divided by a weakening portion formed by a slit (i.e., the sealed zone as indicated numeral 10).

In contradiction to the prior-art, when in use, the capsule body is not compressed, but separator 11 is activated (e.g., by being pushed via aperture 2 using a corresponding actuating rod) thereby pressurizing the content of the capsule 1 and urging it to discharge through the passage opening 15 of channel 9. The separator 11 is adapted to ensure that all the liquid substance from the filling cavity will be discharge through the passage opening 15 of the dispensing channel 9. In addition, by applying pressure on the break-off closure 13, passage opening 15 becomes unsealed. In some embodiments, by applying pressure on the break-off closure 13, cover sheet 7 may begin to peeled off starting from the portion that covers the discharge end (i.e., at the passage opening 15) of dispensing channel 9 (i.e., at the sealed zone 10). As a result, a passage is formed at the surface of tab 8 that defines the discharge end of dispensing channel 9, so as to allow substance to pass through the passage from the filling cavity through channel 9 and to be discharge therefrom.

Figure 5A:
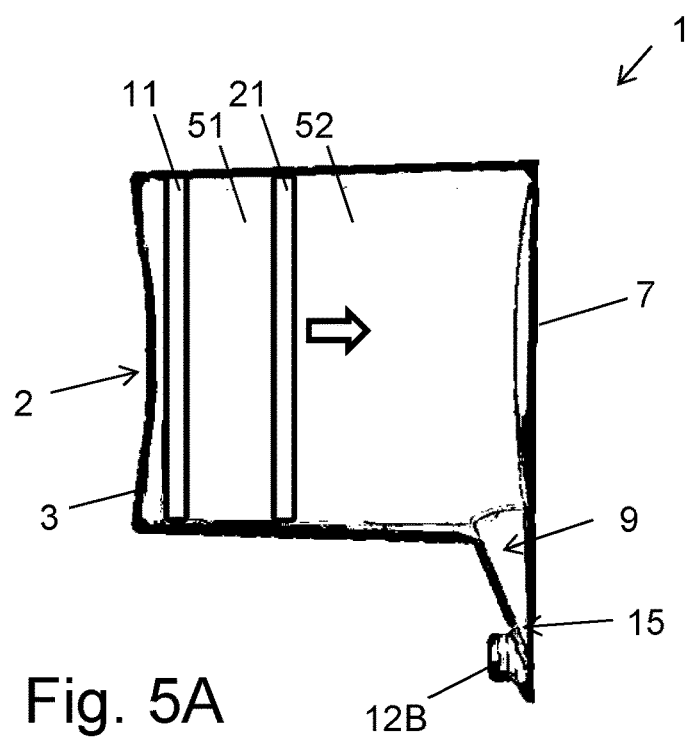
FIGS. 5A and 5B show a cross-section side view of the capsule provided with two separators, according to an embodiment of the invention.
Figure 5B:
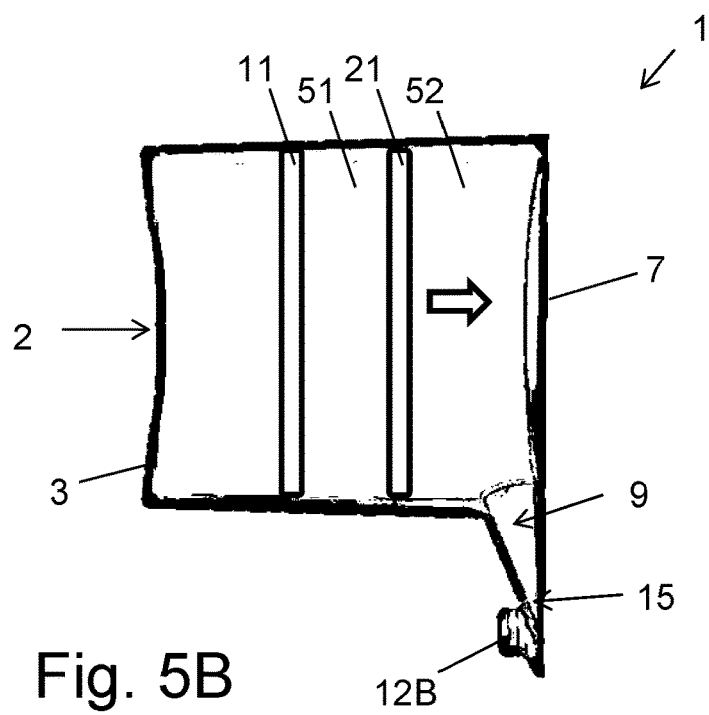

According to some embodiments of the invention, capsule 1 may include more than one separator slidably mounted in the body of capsule 1. In such embodiments, the separators are space apart in a way that the separators divide the cavity of the capsule 1 into two or more compartments each of which adapted to store liquid substance, either the same liquid substance or different liquid substance in each compartment. FIGS. 5A and 5B schematically illustrate capsule 1 provided with two separators as indicated by numerals 11 and 21, according to an embodiment of the invention. The arrow in each of these figures indicates the movement direction of both separators 11 and 21. Using the two separators 11 and 21 divides the cavity into two compartments 51 and 52. In such configuration capsule 1 can be used for the preparation of more than one dose or cup, as well as mixing between two different substances. For example, compartment 51 may include milk while compartment 52 may include coffee flavor.

Figure 4:
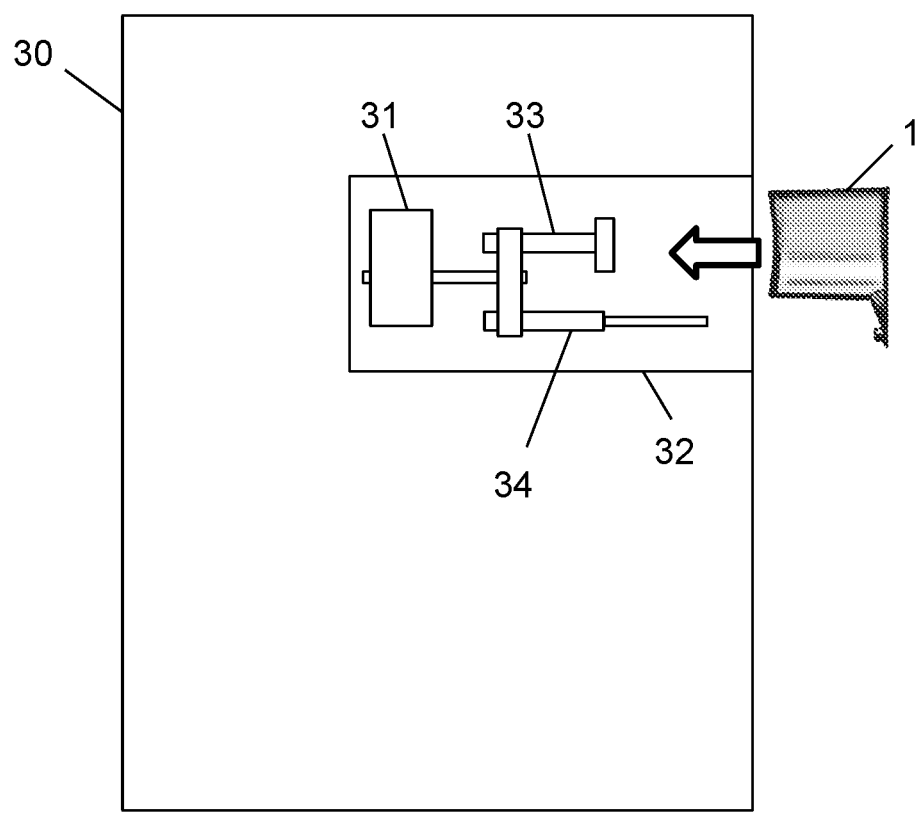
FIG. 4 schematically illustrates a drink dispensing device having a receiving and actuating unit to which the capsule of FIG. 1 is adapted to be inserted, according to an embodiment of the present invention.

Referring now to FIG. 4, capsule 1 can be installed and used with a drink dispensing device 30 that comprises common elements such as a water source for feeding water either from a water storage tank or a water supply line (not shown), a platform (not shown) for placing a cup or another serving container on which is to be filled with a drink. The drink dispensing device 30 may include one or more dispensing pipes (not shown) through which water can be dispensed, either warm water, cold water, carbonated water, ambient water or any kind of other liquid-based substances, such as alcoholic beverages, beer, natural liquids or any other liquids that may be consumed by drinking or eating.

According to an embodiment of the invention, the dispensing device 30 comprises receiving and actuating unit as indicated by numeral 32. Unit 35 adapted to receive and actuate the capsule 1 described hereinabove that is filled with a single portion of a substance, e.g. coffee concentrate or syrup for a soft drink.

The unit 32 includes a linear motor 31, which is adapted to drive a first pushing member 33 (e.g., an actuating rod) to activate the separator 11 of capsule 1 (i.e., to actuate separator 11 so that it will slide in a liquid discharging direction in order to discharge the liquid substance through the liquid discharging portion, e.g., towards the opening 6 of capsule 1). The pushing member 33 is adapted to engage the outer surface of separator 11 through aperture 2 of bottom 3 of capsule 1. In other possible embodiments the drive means can comprise pneumatic means, hydraulic means or can be adapted to be hand driven.

The dispensing device 30 further comprises one or more initial pushing members 34 adapted to apply pressure on sections 12a and 12b of closure 13, prior to or at same time of the actuation of separator 11. The pressure applied to closure 13 unseals passage opening 15 (or in some embodiments it peels off the cover sheet 7), thereby at least the discharging end of dispensing channel 9 is revealed. Pushing members 34 may also be driven by motor 31 (as shown in the figure), or by a separate actuating mechanism (e.g., a dedicated electric motor). For example, the forces applied to closure 13 can be in the range of 0.1 to 15 Kilograms (Kg), where the forces applied to separator 11 can be in the range of 0.1 to 30 Kg.

Separator 11 can advantageously be used to apply pressure on the substance stored in capsule 1 such that the substance in the filling cavity will be able to be dispensed for the preparation or serving of more than one dose or cup. This means that there might be only negligible losses which are advantageous from an economic view point.

Further, the receiving means 32 may have a front plate provided with a recess 34 with a depth and form substantially corresponding to the thickness and form of the circumferential rim 5 with the extending tab 8 and the alignment rails 14A-14D of capsule 1. Recess 34 has the advantage that the capsule 1 can only be placed in one manner in the receiving means, thereby securing a proper functioning and use of the apparatus.

Upon actuation of separator 11, whereby the substance is pressurized, and the passage opening 15 was already unsealed (or cover sheet 7 was already peeled off at least at the discharge end of dispensing channel 9) e.g., optionally after the weakening portion of break-off closure 13 has been broken or fold/moved at the zone indicated by numeral 10), resulting in the dispensing channel 9 being open as is described hereinabove.

By further actuating separator 11 all the substance can be dispensed into a cup or another container. Then ambient, cold, warm or carbonated water can be added through device's pipe.

Figure 6A:
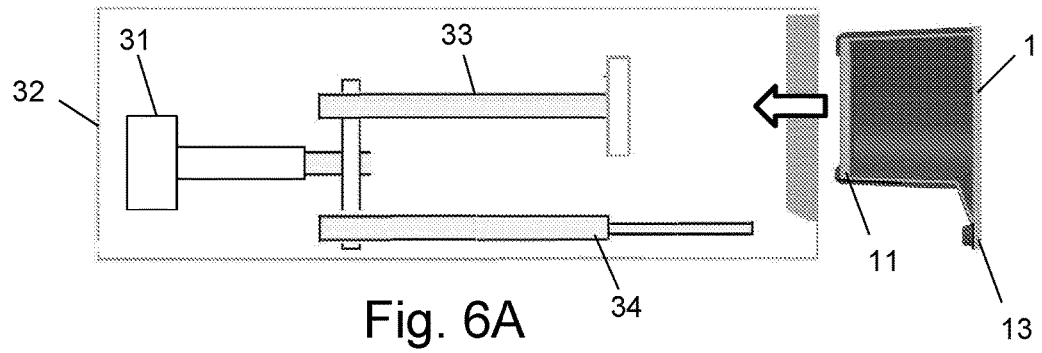
FIGS. 6A-6C schematically illustrates the insertion of the capsule of FIG. 1 into receiving and actuating unit of the drink dispensing device of FIG. 4.
Figure 6B:
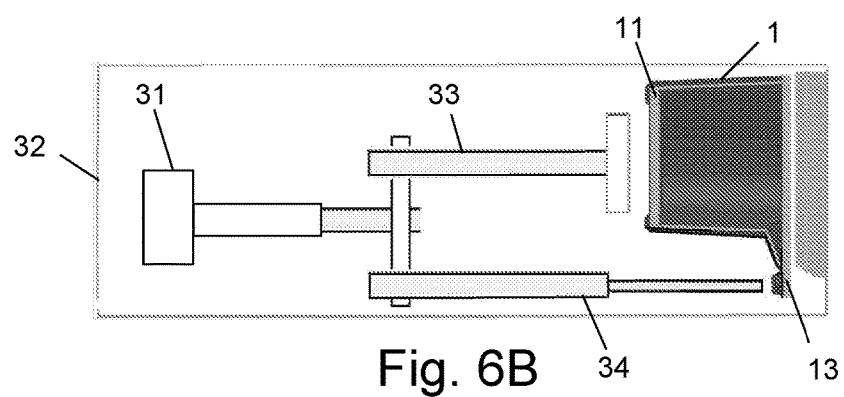
Figure 6C:
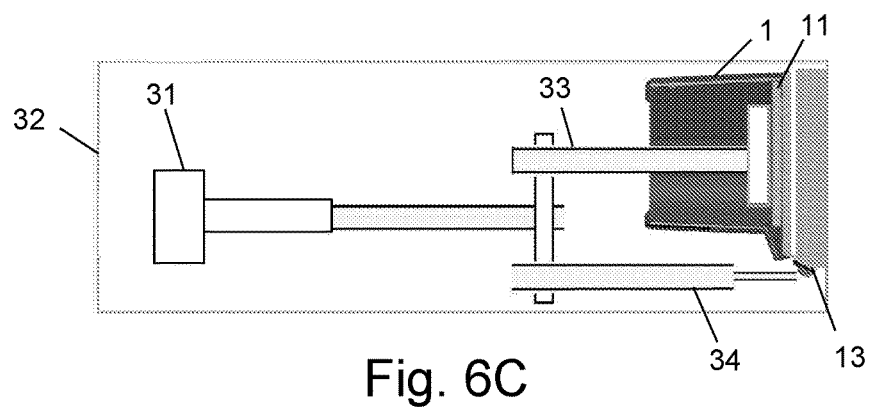

FIG. 6A-6C schematically illustrates the insertion of capsule 1 into receiving and actuating unit 32 of the drink dispensing device 30 of FIG. 4. FIG. 6A shows capsule 1 prior to its insertion into unit 32, FIG. 6B shows capsule 1 installed within unit 32, and FIG. 6C shows the actuation of separator 11 and the break-off closure 13 by pushing members 33 and 34, where separator 11 is now positioned adjacent to opening 6 of capsule 1 and the break-off closure 13 is folded or broken.

The dispensing device 30 may comprise identification recognition means for automatically identifying the product family of capsule 1 (not shown). Therefore, capsule 1 may comprise identification means 99. For example, the identification means 99 can be applied to the cover sheet 7, to the bottom 3 or to the side wall 4 of capsule 1. The identification means 99 could be visual identification means, e.g. a bar code or the like. Also electronic identification means are possible. The identification means applied to the capsule correspond to a specific family of products contained in the capsule. For example, if a capsule 1 with concentrated substance (e.g., orange juice, apple juice) that is marked as a carbonated water product (i.e., carbonated product family) is placed correctly in the corresponding receiving means, the dispensing device 30 may automatically know that there has to be added a certain predetermined amount of carbonated water to the cup. If a capsule with concentrated substance (e.g., orange juice, apple juice) that is marked as a cold water product (i.e., cold water non-carbonated product family) is placed correctly in the corresponding receiving means, the dispensing device 30 may automatically know that there has to be added a certain predetermined amount of cold water to the cup. In the same manner, when inserting a product of a hot beverage family (e.g., coffee) the dispensing device 30 may automatically know that there has to be added a certain predetermined amount of hot water to the cup. In other words, the dispensing device 30 supplies the relevant liquid type, such as cold water, hot water or carbonated water according to the identified product family (i.e., the product family triggers the dispensing device 30 to supply the proper type of liquid).

The container can be filled with variety of substance such as concentrate for coffee, tea, chocolate, soup, dairy products like milk or yoghurt drinks, fruit and natural juices, soft drinks, sport drinks, etc. The use of dispensing a substance from a container in the manner, as is described hereinabove is however not only delimited to applications with beverage and food products. It is also possible to use this principle in non-food applications, e.g. in medical applications for dispensing a dose of a medicament.

As will be appreciated by the skilled person the arrangement described in the figures results in a capsule from which a substance can be discharge without compressing the capsule body, thereby obtaining a much cleaner result with respect to the prior art.

All the above description and examples have been given for the purpose of illustration and are not intended to limit the invention in any way. Many different mechanisms can be employed, all without exceeding the scope of the invention.

The invention claimed is:

1. A capsule adapted to be inserted into a dispensing device for a preparation of edible/drinkable products, comprising:

a body defining a filling cavity filled with substance, said body comprises a liquid-discharging portion provided at a first end of said body through which said substance is discharged from said body whenever said liquid-discharging portion becomes unsealed, and an accessing region provided at a second end of said, body through which said capsule is actuated to discharge the substance, wherein said liquid-discharging portion includes a dispensing channel in fluid communication with the cavity, wherein said dispensing channel extends from the body of said capsule at the first end, wherein the substance is discharged through said dispensing channel upon unsealing at least one passage opening at said dispensing channel that is sealed by a break-off closure, such that by folding or breaking said break-off closure said at least one passage opening becomes unsealed; and at least one separator slidably mounted in said body, wherein said separator is adapted to slide in a liquid discharging direction in order to discharge said substance through said liquid-discharging portion, whenever an actuation of said separator is applied through the accessing region.

2. The capsule according to claim 1, in which the liquid-discharging portion includes an opening at the first end of said cavity and an integral planar circumferential rim surrounding said opening, wherein said opening and said planar circumferential rim being covered by a cover sheet, which is sealed to said planar circumferential rim at a circumferential sealing seam, wherein the substance is discharged through said opening upon forming at least one passage opening at said cover sheet.

3. The capsule according to claim 2, in which the at least one passage opening is formed by perforating the cover sheet.

4. The capsule according to claim 1, in which the liquid-discharging portion includes:
- an opening at the first end of the filling cavity of said capsule;
- an integral planar circumferential rim surrounding said opening;
- a dispensing channel in fluid communication with said cavity and extending from said opening by said planar circumferential rim; and
- a cover that covers said opening, said planar circumferential rim and said dispensing channel,
- wherein the substance is discharged through said dispensing channel upon unsealing/forming at least one passage opening at said dispensing channel.

5. The capsule according to claim 4, in which the cover is in form of a thin layer that is sealed to the planar circumferential rim at a circumferential sealing seam.

6. The capsule according to claim 5, in which the at least passage opening is unsealed/formed by peeling off at least a portion of the thin layer that seals the, dispensing channel.

7. The capsule according to claim 4, in which the cover is made of material(s) selected from the group consisting of metal or plastic, in particular an aluminum foil or a plastic foil.

8. The capsule according to claim 4, in which the dispensing channel includes an operable closure which seals the at least one passage opening at said dispensing channel, such that by applying force on one or more sections of said closure said at least one passage opening becomes unsealed.

9. The capsule according to claim 4, in which the dispensing channel having a funnel form or a semi conical form, thereby enabling to facilitate the discharging of the substance.

10. The capsule according to claim 1, in which the capsule includes identification means that corresponds to a specific substance contained in said capsule, thereby allowing a dispensing device loaded with said capsule to automatically identify said capsule and the substance stored therein.

11. The capsule according to claim 1, in which the body further comprising one or more alignment rails parallel deployed along the length of said body, to correctly insert said capsule into a corresponding dispensing device and to act as reinforcement beams in order to prevent deformation of the structure of the body of said capsule.

12. The capsule according to claim 1, in which the capsule is used for the preparation of more than one dose or cup by using more than one separator slidably mounted in the body of said capsule, wherein the separators are space apart in a way that the separators divide the cavity of the capsule into two or more compartments each of which adapted to store substance, either the same substance or different substance in each compartment.

13. The capsule according to claim 1, in which the separator having a disk-like form.

14. A dispensing device adapted to receive and actuate the capsule of claim 1 for the preparation of edible/drinkable products, comprising: a water source for feeding water through one or more dispensing pipes to a cup or a serving container that is adapted to be filled with a drink or a thick-food product, a receiving and actuating unit adapted to receive and actuate the capsule, wherein said receiving and actuating unit includes a power unit for activating a first actuator adapted to cause the discharging of the substance stored within said capsule, by pushing the separator that is slidably mounted in the body of said capsule in a liquid discharging direction, either directly or indirectly, towards the liquid discharging portion of said capsule.

15. The device according to claim 14, in which the water source is a water storage tank or a water supply line.

16. The device according to claim 14, further comprising a platform for placing the cup.

17. The device according to claim 14, in which the dispensing pipes dispense either warm water, cold water, carbonated water, ambient water or any kind of other liquids such as alcoholic, beer or natural liquids.

18. the device according to claim 14, in which the first actuator is adapted to engage an outer surface of the separator of the capsule through.an accessing region at the body of said capsule.

19. The device according to claim 14, in which the power unit includes at least one of the following activating means: pneumatic means;
- hydraulic means, linear electric motor, hand driven, or any combination thereof.

20. The device according to claim 14, further comprises identification recognition means for automatically identifying the capsule and its content.

* * * * *